Jan. 10, 1950   F. I. STEELE ET AL   2,494,367
RETRACTABLE STEP
Filed March 20, 1947
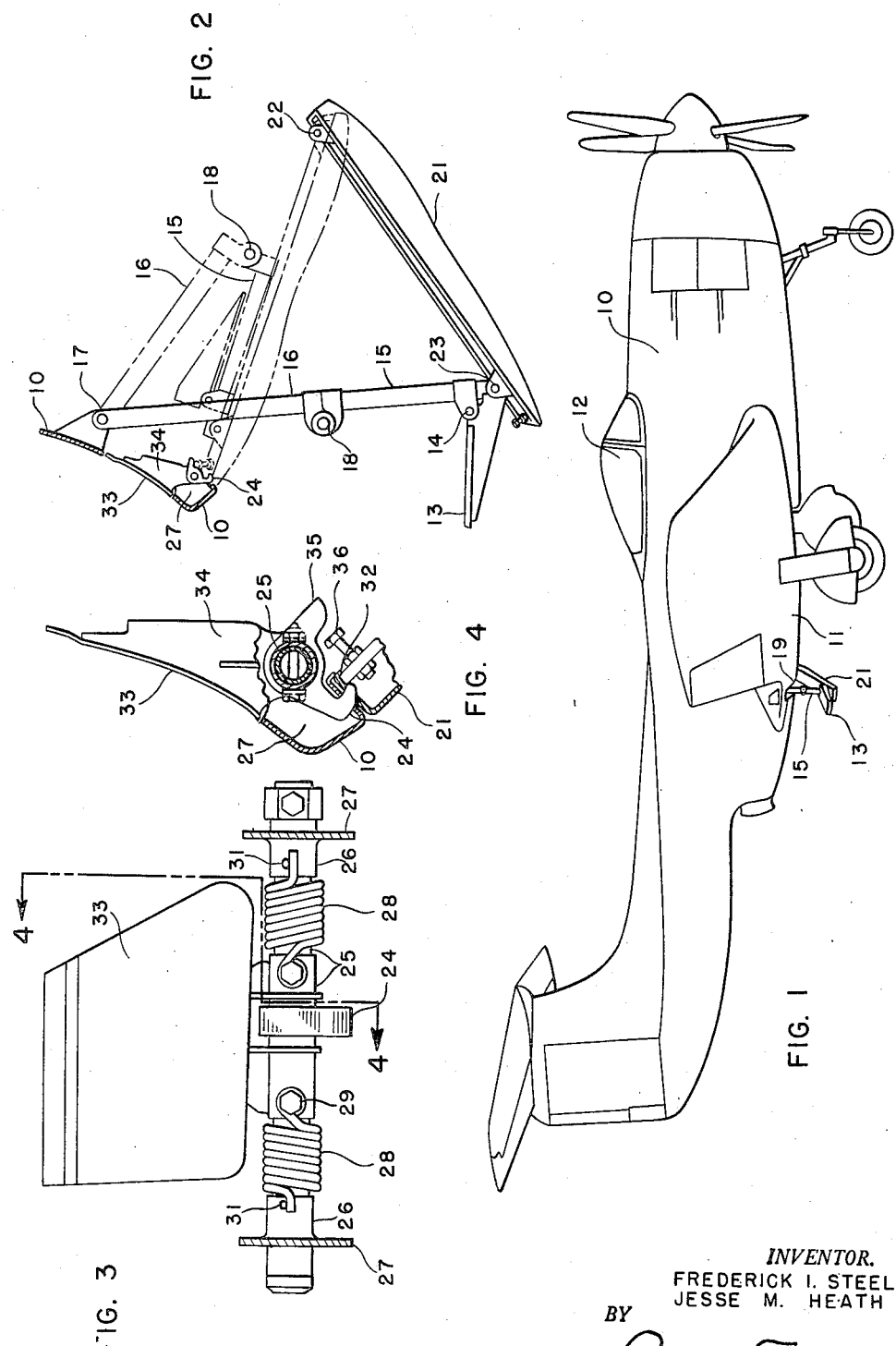
INVENTOR.
FREDERICK I. STEELE
JESSE M. HEATH
BY
Richard W. Treverton
ATTORNEY Patented Jan. 10, 1950

2,494,367

UNITED STATES PATENT OFFICE 2,494,367

RETRACTABLE STEP

Frederick I. Steele, Columbus, Ohio, and Jesse M. Heath, Kenmore, N. Y., assignors to Curtiss-Wright Corporation, a corporation of Delaware Application March 20, 1947, Serial No. 735,996

9 Claims. (Cl. 244—129)

1

The present invention relates to a retractable step for aircraft and particularly to the combination with such step of a supporting and actuating mechanism which when retracted may have the exposed surfaces thereof in substantially flush relation with the aircraft surface.

In certain types of aircraft the handholes and steps conventionally provided in the fuselage, and also the walkways along the wing roots, are too high above the ground to provide easy access to the airplane cabin or cockpit. In such cases it is often desirable to provide, as a permanent part of the aircraft, a ladder or step which may provide foot support at a lower level.

It is an object of the present invention to provide a step device which may be extended downwardly from the fuselage or other part of the airframe through an opening therein to facilitate boarding or leaving the aircraft and which may be retracted or folded up through such opening and into the supporting structure for flight. It is a further object of the invention to provide such a step device which when retracted into such opening will provide a closure for the opening that is in substantially flush relation with the adjacent surface portions of the aircraft.

In the preferred form of the invention the retractable step is carried by a folding hanger strut having a brace which in retracted position is flush with the adjacent surface portions of the airplane. The assembly is held retracted by a latch whose release allows the assembly to extend by gravity to dispose the step approximately midway between the ground and a foot support on the airplane itself. The latch also includes a part that is normally flush with the surface of the aircraft and is arranged to be pushed inwardly to release the latch. With this arrangement no parts associated with the step project into the airstream to produce drag when the aircraft is in flight. Yet when needed the step may be brought into operative position by simply exerting a pressure upon the latch surface.

The foregoing and other objects and advantages of the invention will become apparent from the following description of the typical embodiment shown in the accompanying drawings, wherein:

Figure 1 is a side view of an airplane with the step means in extended position;

Figure 2 is a front view wherein the step means are shown by full lines in their extended position and by broken lines in their retracted position.

2

Figure 3 is an elevational view, on a larger scale, of the latch mechanism; and, Figure 4 is a sectional view taken substantially along line 4—4 of Figure 3.

Illustrated in Figure 1 is a fighter type of airplane 10 having a main wing 11 whose root portion may be provided with a walkway to be used in entering or leaving the cockpit 12. Such walkway is of substantial height above the ground even at the trailing edge of the wing when the airplane is in its normal attitude upon the ground, and, accordingly, the step 13 of the present invention is provided.

The step is pivoted at 14 to the outer section 15 of a folding hanger strut whose inner section 16 is pivoted at 17 to the airplane structure 10. The sections 15 and 16 are pivotally connected at 18 and are provided with abutting end faces arranged to prevent outward folding of the strut from extended position although permitting inward folding to the retracted position shown in broken lines in Figure 2. Likewise the step 13 and hanger section 15 have abutting faces arranged to prevent collapse of the step when loads are placed upon it.

For bracing the hanger strut 15, 16 when extended against movement about pivot 18, for guiding the strut to and from retracted position, and also for closing the opening 19 in the structure 10 through which the step and strut extend, a brace member 21 is provided. This brace is pivoted at 22 to the airframe 10 and at 23 to strut section 15. Its outer face is so shaped that in the retracted position of the step assembly it provides a substantially flush closure or fairing for the opening 19.

The step assembly may be retracted to the broken line position shown in Figure 2 by breaking the strut 15, 16 inwardly and then lifting the brace 21. To retain the assembly in retracted position a pivoted latch 24 is provided. The latch proper is mounted on tubular shaft 25 that is journalled at its ends in bearings 26 carried on inward projections 27 from the aircraft structure 10.

Torsion springs 28 each secured by a bolt 29 to the shaft 25 have their unsecured ends bearing against projections 31 from the bearings 26, so that the springs constantly urge the latch and its shaft in a counterclockwise direction (as the parts appear in Figures 2 and 4) to cause the latch to engage a suitable detent in the end face of brace 21. The latch is so formed that as the edge portion 32 of brace 21 engages it during the final phase of brace retraction, it is cammed clockwise to permit completion of the retractive movement and then springs into the latching relation shown in Figure 2.

For unlatching the step to cause it to extend by gravity, the latch has a plate part 33 connected to shaft 25 by arms 34. As shown the plate normally lies in flush relation with the adjacent aircraft structure 10, being held in such relation by the springs 28. The latch 24 also has an extension 35 that is engageable with an adjustable inward projection, comprising a bolt 36, carried by the brace 21.

Inward movement of the plate 33 (clockwise movement about the axis of shaft 25 as the parts appear in Figures 2 and 4) will withdraw the latch proper, 24, from engagement with the brace 21 to allow gravity to extend the step assembly. Such movement of the latch will also cause the extension 35 to engage projection 36 of the brace 21 and positively initiate opening or extending movement of the latter. This is important particularly if the brace or other part of the assembly should tend to stick in closed position, because the flush relation with the adjacent surface portions of the airplane makes it difficult if not impossible for a person to grip the brace with his fingers.

It will be understood that the step assembly herein described, while representing a preferred embodiment of the invention, is merely illustrative of the inventive principles involved, and that these principles may be otherwise embodied without departing from the spirit of the invention or from the scope of the appended claims.

We claim:

1. In combination with an airframe having a pair of openings therein, a step and an articulated hanger therefor, said hanger being secured within said airframe and being extensible to carry the step outwardly through one of said openings, a member pivotally connected to the airframe and to said hanger for bracing the latter in the extended position thereof and when retracted for closing said one opening, a closure for the other of said openings pivoted to the airframe to open inwardly, said closure having movable therewith a latch for engaging and holding said member closed when said closure is in closed position and for releasing when said closure is opened.

2. In combination with an airframe having a pair of openings therein, a retractable step assembly secured to the airframe and adapted to be extended outwardly through one of said openings to dispose the step portion thereof exteriorly of the airframe, said assembly including a member providing a substantially flush closure for said one of said openings in the retracted position, a closure for the other of said openings pivoted to the airframe to open inwardly, said closure having movable therewith a latch for engaging and holding said member closed when said closure is in closed position and for releasing when said closure is opened.

3. In combination with an airframe having an opening therein, a folding hanger comprising an inner section pivoted to the airframe and an outer section, said hanger when folded being disposed within the airframe and when extended projecting through said opening, a step secured to the outer section and movable therewith through said opening, and a member pivoted to the airframe and to said outer section for guiding the latter between extended and retracted positions and for bracing the hanger in the extended position thereof, said member being arranged to close said opening when said hanger is folded.

4. In combination with an airframe having an opening through an under surface thereof, a folding hanger comprising an inner section pivoted to the airframe above said opening and an outer section, said hanger when folded being disposed within the airframe and when extended depending through said opening, a step pivoted to said outer section for folding relative thereto when the hanger is folded and movable bodily therewith through said opening, a member pivoted to the airframe and to said outer section for guiding the latter between extended and retracted positions and for bracing the hanger in the extended position thereof, said member being arranged to close said opening when said hanger is folded, the assembly comprising said hanger and member and step being extensible by gravity, and latch means for holding said assembly retracted.

5. In combination with an airframe having an opening through an under surface thereof, a folding hanger comprising an inner section pivoted to the airframe above said opening and an outer section, said hanger when folded being disposed within the airframe and when extended depending through said opening, a step secured to said outer section and movable therewith through said opening, a member pivoted to the airframe and to said outer section for guiding the latter between extended and retracted positions and for bracing the hanger in the extended position thereof, said member being arranged to close said opening when said hanger is folded, the assembly comprising said hanger and member and step being extensible by gravity, and latch means for holding said assembly retracted, said latch means comprising a part normally substantially flush with the airframe surface and movable inwardly from such normal position to release the latch means, and said latch means comprising an abutment to engage said assembly to positively initiate extension of said assembly.

6. In combination with an airframe having a pair of openings, a substantially flush closure for one of said openings pivoted to the airframe to open outwardly, a latch pivoted to the airframe and provided with spring means for holding it in latch engagement with said closure, said latch when so engaged holding said closure against opening movement, said latch having movable as a unit therewith a normally substantially flush closure for the other opening, the last-mentioned closure being movable to open inwardly of the airframe against the resistance of said spring means to release the latch.

7. In combination with an airframe having a pair of openings, a substantially flush closure for one of said openings pivoted to the airframe to open outwardly, a latch pivoted to the airframe and provided with spring means for holding it in latch engagement with said closure, said latch when so engaged holding said closure against opening movement, said latch having movable as a unit therewith a normally substantially flush closure for the other opening, the last-mentioned closure being movable to open inwardly of the airframe against the resistance of said spring means to release the latch, and an extension from said latch for engaging and positively initiating opening of the first-mentioned closure when said last-mentioned closure is opened inwardly.

8. In combination with an aircraft body having an opening therein, a step support including a member for closing said opening and having a pivotal connection to said body to open outwardly, said step support further including a folding hanger comprising an inner section pivoted to said body and an outer section pivoted to the closure member so that the hanger will be extended when said member is opened, the hanger projecting through said opening when so extended and being disposed within said body when said member is closed, the juncture of the upper and lower sections of the hanger moving toward said pivotal connection as said member is closed, and a step carried by step support adjacent the pivot of the said member with the outer section of the hanger and movable with the latter through said opening as the hanger is extended and folded.

9. In combination with an aircraft body having an opening in an under surface thereof, a member for closing said opening and having a pivotal connection to said body to open downwardly, a folding hanger comprising an inner section pivoted to said body and an outer section pivoted to the closure member to cause the hanger to be extended when said member is opened, the hanger projecting downwardly through said opening when so extended and being disposed within said body when said member is closed, the juncture of the upper and lower sections of the hanger moving toward said pivotal connection as said member closes, a step carried by the outer section of the hanger and movable therewith through said opening as the hanger is extended and folded, the assembly comprising said hanger and member and step being extensible by gravity, and latch means for holding said assembly in retracted position wherein said member is closed.

FREDERICK I. STEELE.
JESSE M. HEATH.

REFERENCES CITED

The following references are of record in the file of this patent:

UNITED STATES PATENTS

| Number | Name | Date |
| --- | --- | --- |
| 1,220,087 | Garrigan | May 20, 1917 |
| 1,471,972 | Miller | Oct. 23, 1923 |
| 1,877,152 | Vogel | Sept. 13, 1932 |
| 2,125,085 | Pool | July 26, 1938 |
| 2,196,546 | Bowers | Apr. 9, 1940 |
| 2,220,035 | Brack | Oct. 29, 1940 |
| 2,383,930 | Reynolds | Aug. 28, 1945 |
| 2,409,418 | Carmichael | Oct. 15, 1946 |
| 2,417,987 | McFarland | Mar. 25, 1947 |